Patented May 22, 1923.

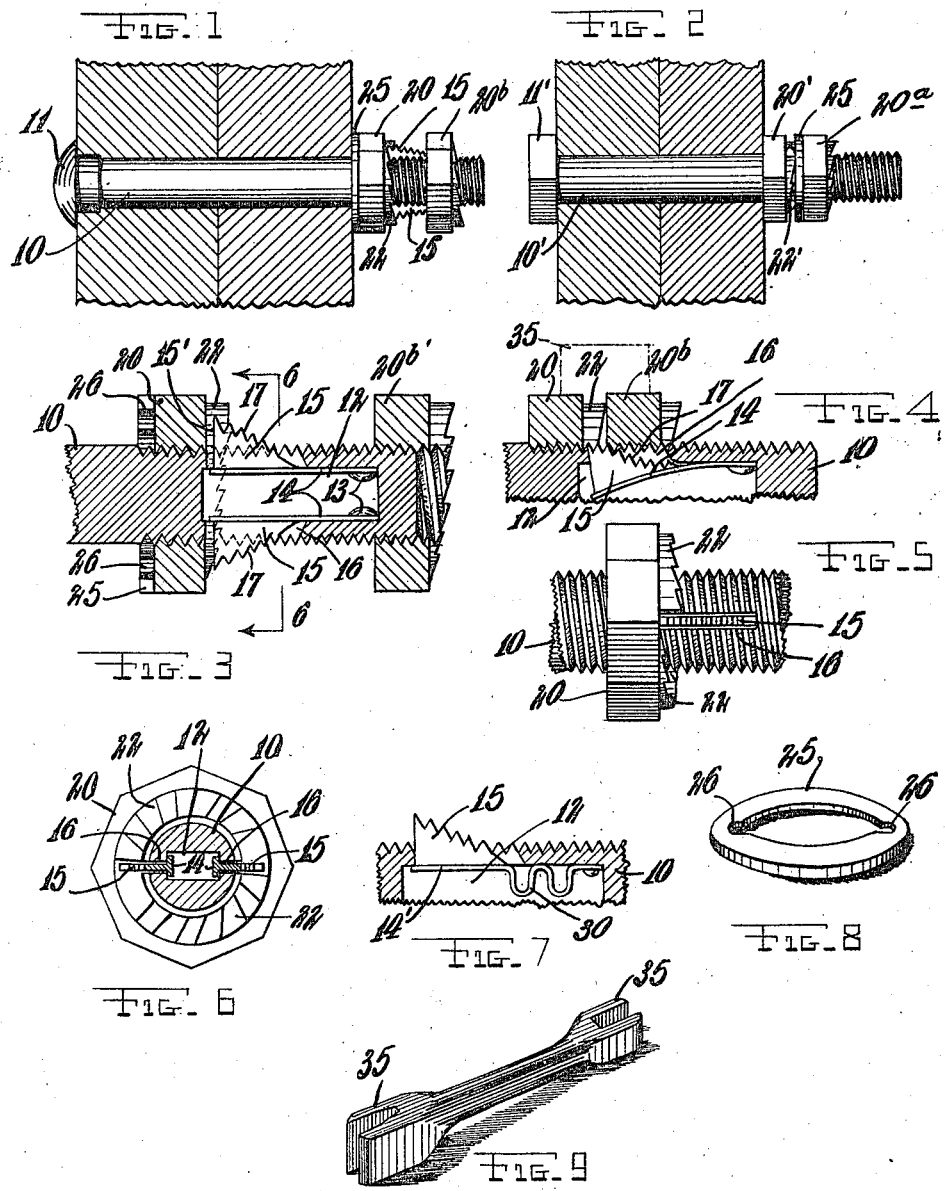

1,455,804

UNITED STATES PATENT OFFICE.

STANLEY NOVINSKI, OF BRAZNELL, PENNSYLVANIA, ASSIGNOR OF ONE-HALF TO SZYMON SPRYSZAK, OF BRAZNELL, PENNSYLVANIA.

NUT LOCK.

Application filed February 13, 1922. Serial No. 536,016.

*To all whom it may concern:*

Be it known that I, STANLEY NOVINSKI, citizen of Poland, residing at Braznell, in the county of Fayette and State of Pennsylvania, have invented certain new and useful Improvements in Nut Locks, of which the following is a specification.

This invention relates to nut locks, having more particular reference to a nut lock in which a movable element is carried by the bolt and adapted to engage the nut.

The invention has for a general object to provide an improved form of nut lock which permits of the ready removal of the nut when desired.

More specifically speaking the invention has for an object to provide the bolt with a spring pressed latch which normally projects from the bolt but is automatically moved into a recess in the bolt when the nut is screwed on the latter, and which springs out behind the nut.

For further comprehension of the invention, and of the objects and advantages thereof, reference will be had to the following description and accompanying drawings, and to the appended claims in which the various novel features of the invention are more particularly set forth.

Fig. 1 of the drawings is a side view showing a bolt and nut having the invention applied thereto, the parts secured together by the bolt being indicated in section.

Fig. 2 is a similar view but showing a slightly different arrangement.

Fig. 3 is a fragmentary axial sectional view of the device.

Fig. 4 is a fragmentary axial sectional view, but showing the locking elements withdrawn into the bolt.

Fig. 5 is a fragmentary side view at right angles to Fig. 1.

Fig. 6 is a transverse sectional view taken on the line 6—6 of Fig. 3.

Fig. 7 is a detail elevation showing a modified form of spring mounting for the latches.

Fig. 8 is a detail perspective view of the washer.

Fig. 9 is a perspective view of the spanner for applying and removing the nuts.

Referring now to Fig. 1 the reference numeral 10 indicates a bolt of the type commonly known as a stove bolt and which is in common use in securing together parts of automobiles or other vehicles, or machinery and articles of manufacture generally, the head of the bolt being indicated at 11. Within the bolt is formed a longitudinally extending recess or chamber 12 in opposite sides of which are secured at one end as at 13, by soldering or other suitable means, a pair of flat springs 14.

These flat springs have fixed thereto the fin-like latch members 15 which project outwardly through longitudinal slots 16 in the bolt. The ends 15' of these members 15, which face toward the head of the bolt, are cut off transversely to the bolt so as to present abutment shoulders projecting over the nut to prevent withdrawal of the latter. The outer edges of these latch members are inclined inwardly as shown from the ends 15' toward the opposite ends and present serrations 17 which are arranged to coincide with the threads of the bolt when the latches are pressed inwardly as in Fig. 4.

In the construction shown in Fig. 1 the nut is shown at 20 and may be of hexagonal or other suitable shape. This nut is screwed in the usual manner on the bolt, passing freely over the latches 15, engaging the serrated outer faces thereof and pressing them inwardly, the springs throwing the latches out behind the nut 20 after the latter has passed thereover.

In use, bolts of the approximate required length, between the latches 15 and head 11 will be selected but to accommodate slight variations I provide on the rear face of the nut 20 the semi-annular projecting ribs 22 presenting inclined ratchet formed rear faces which engage with the ends of the latches 15 to hold the nut against rearward rotation.

In connection with my improved nut lock I provide a washer 25 having a pair of opposed notches 26 in the wall of the aperture therein, these notches being of sufficient size to allow the latches 15 to pass freely therethrough when the nut is placed on the bolt. When a single nut is used on the bolt the latter may be placed in front of the nut as in Fig. 1.

The construction shown in Fig. 2 differs from that in Fig. 1 in showing a bolt 10' such as may be used on railroad tracks and having a square head 11'. In this case I show a pair of nuts, 20' and 20ª respectively, and insert the washer 25 therebetween to prevent the second nut 20ª moving the latches 15 completely into the bolt and out of locking engagement behind the first nut 20'. The ribs 22' which I here provide to engage the latches 15 are of similar construction to the ribs 22, but have an opposite inclination as shown, it being understood that I may use either type of ribs as desired.

In Fig. 7 I have shown a modified construction of spring, indicated at 14', for holding the latches 15. This spring is formed near its fixed end with one or more convolutions 30 which permit of a longitudinal yielding movement of the latches 15 when the ratchet faced ribs 22 engage therewith. When this type of spring is used the ratchet faces of the ribs have a general inclination corresponding to that of the threads of the bolt, the nut being thus readily locked at various points, circumferentially considered.

When the nut is to be removed, a second nut is first threaded on the bolt, this nut being indicated at 20ᵇ in Figs. 1, 3 and 4, this nut pressing the latches inward, as shown in Fig. 3, both nuts being then removed together.

For applying and removing the bolts I employ the wrench or spanner shown in Fig. 9 one of the jaws 35 whereof is, as indicated in Fig. 4, of sufficient depth to engage the two nuts at once.

Having thus described my invention what I claim as new and desire to protect by Letters Patent of the United States is as follows:

1. In combination, a bolt having a recess formed therein, a latch fixed in said recess and normally projecting laterally beyond the bolt, a nut threaded on the bolt and being formed on its rear face with ratchet toothed projections, and a spring fixed to the bolt and carrying said latch and adapted to permit both of lateral and longitudinal movement of the latch with respect to the bolt.

2. In combination, a bolt having a recess formed therein, a pair of longitudinally convoluted spring strips fixed at one end in said recess, and a pair of fin-like latch members fixed on said springs and projecting outward through slots in the bolt, said latch members having longitudinally inclined outer faces formed with serrations complementing the threads of the bolt, and a nut threaded on the bolt and being formed on its rear face with semi-annular ribs having ratchet toothed spirally inclined rear faces.

3. In combination, a bolt having a recess therein, a nut on said bolt, a pair of latch members carried in said recess and engaging behind said nut, and a washer on said bolt having notches cut in the wall of its aperture to receive said latch members.

4. In combination, a bolt having a recess formed therein, a pair of flat springs fixed at one end in said recess, and a pair of fin-like latch members fixed on said springs and projecting outward through slots in the bolt, said latch members having longitudinally inclined outer faces formed with serrations complementing the threads of the bolt, and a nut threaded on the bolt and being formed on its rear face with semi-annular ribs having ratchet toothed spirally inclined rear faces, said springs being formed with convolutions permitting longitudinal yielding movement of said latches.

In testimony whereof I have affixed my signature.

STANLEY NOVINSKI.